E. J. TIMMONS.
LIGHT ATTACHMENT FOR FISHING TACKLE.
APPLICATION FILED MAY 26, 1919.
1,337,292. Patented Apr. 20, 1920.
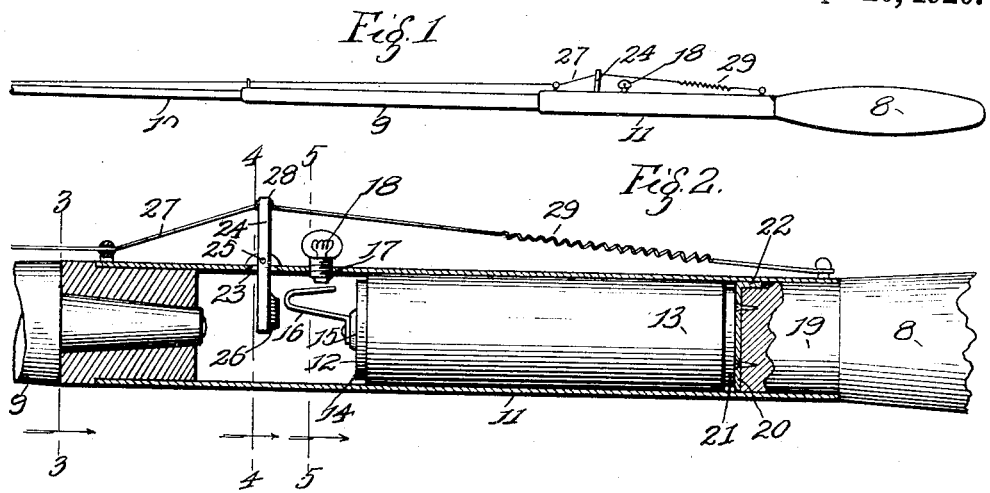
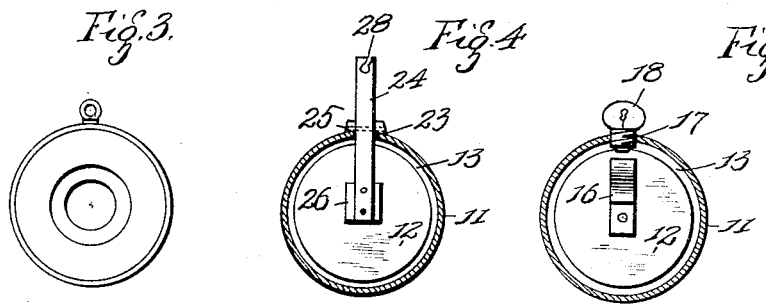
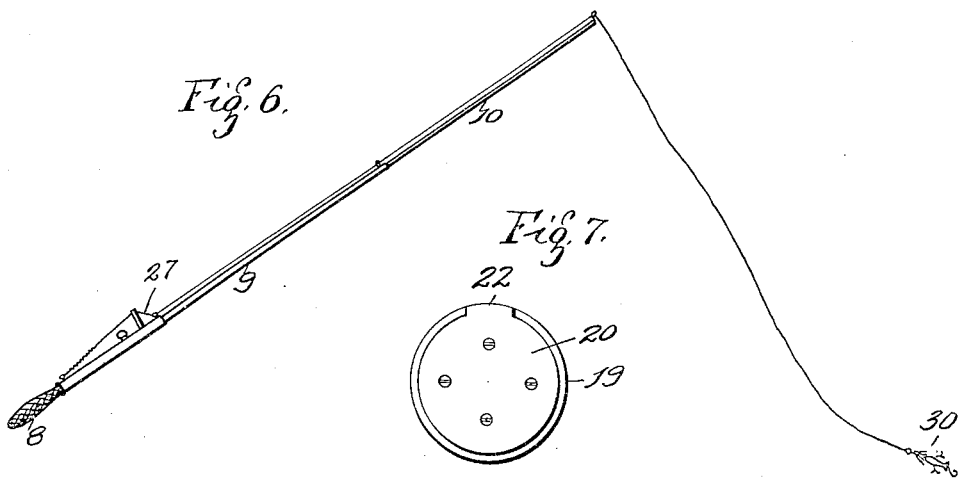
Inventor
Edward J. Timmons

UNITED STATES PATENT OFFICE.

EDWARD J. TIMMONS, OF ST. LOUIS, MISSOURI.

LIGHT ATTACHMENT FOR FISHING-TACKLE.

1,337,292.  Specification of Letters Patent.  Patented Apr. 20, 1920.

Application filed May 26, 1919. Serial No. 299,856.

*To all whom it may concern:*

Be it known that I, EDWARD J. TIMMONS, a citizen of the United States, and resident of St. Louis, Missouri, have invented certain new and useful Improvements in Light Attachments for Fishing-Tackle, of which the following is a specification.

This invention relates to improvements in a light attachment for fishing tackle, and has for its object a hollow handle in which is supported a battery, a bulb in close proximity to the battery and a means for grounding the bulb for illuminating the same whenever the tackle is pulled upon by the fish, thus indicating to the fisherman that he has a bite.

A further object of my invention is to construct a light indicating mechanism in such shape as to be attached to any fish rod so that the light will indicate by the action of the fishing line when the fish has taken the bait.

Figure 1, is a side elevation of my invention.

Fig. 2, is a detail sectional view of the mechanism shown in connection with the fishing rod.

Fig. 3, is an end view of the casing viewing it on the line 3—3 of Fig. 2.

Fig. 4, is a cross sectional view taken on the line 4—4 of Fig. 2.

Fig. 5, is a cross sectional view taken on the line 5—5 of Fig. 2.

Fig. 6, is a side view of the fishing rod, showing the line attached to the mechanism.

Fig. 7, is an end view of the handle showing the contact plate by which the electric current is completed for illuminating the lamp.

In the drawings 8 indicates a handle, 9 and 10 the sections of the fishing rod, 11 indicates a tube which is preferably constructed of metal and in which is located a battery 12. This battery is covered with a sheet of insulating material 13, which spaces or separates the zinc or outer covering 14 of the battery from contacting with the metal shell 11.

On the core or carbon end 15 of the battery is attached a spring 16 which is designed to be brought in contact with the plug end 17 of the electric bulb 18.

On the rear end 19 of the handle 8 is provided a contact plate 20 which is brought in close contact with the rear end 21 of the zinc covering of the battery, and this plate is provided with a bent portion 22, which contacts with the metal shell 11.

In the shell is provided a slot 23, through which is suspended a lever 24, held in pivotal position on the shell at the point indicated by the numeral 25. The bottom end of the lever is provided with a fiber or insulating plate 26, which is designed to come in contact with the spring 16, pressing the same upward in contact with the plug 17 of the bulb when the lever is pulled forward by means of the line 27. This line is attached to the upper end 28 of the lever so as to properly manipulate the lever when the line is pulled upon by the fish, and this lever is held out of contact with the spring and in other words, in its normal position as shown in Fig. 2, by the spring attachment 29.

The operation of my invention is as follows: When the fish takes the bait 30 it naturally pulls on the line 27, and in doing so pulls forward on the lever 24 which then brings its insulated end in contact with the spring 16 and presses it in contact with the plug end of the bulb. When this contact is made it closes the circuit allowing the electric current of the battery to pass from the spring through the bulb into the shell and through the plate 20 into the zinc covering of the battery.

The device is especially designed for use in night fishing when it is inconvenient to observe the action of the float. With this arrangement all the fisherman has to do is to watch his light and when the same is illuminated he knows instantly that he has a bite.

I claim—

1. A light attachment for fishing tackle comprising a shell, a handle mounted in one end of said shell, a fishing rod inserted in the opposite end of said shell, a battery located in the shell and in contact with the inserted end of the handle, a lever mounted on the shell and projecting therein, a line attached to the lever for creating a contact when pulled upon, a light bulb supported on the shell, a spring carried by the carbon post of a battery, and an insulating plate mounted on the lever to contact with the spring and press it against the base of the bulb, substantially as specified.

2. A device of the character described comprising a cylindrical shell, a handle inserted in one end of the shell, a contact plate formed on the inserted end of said handle, a battery located in the shell and in contact with the plate, a light bulb supported on the shell in front of the top end of the battery, a lever supported on the shell and projecting therein, an insulating plate located on the lever, a fishing rod inserted in the opposite end of the shell, a fishing line attached to the lever and a spring connected to the battery and in close proximity to the base of the bulb and to be brought in contact therewith by the manipulation of the lever, substantially as specified.

3. A device of the character described comprising a fishing rod having a hollow and cylindrical portion, a battery located therein, a light bulb supported by the cylindrical portion, a spring located on the carbon post of the battery and designed to be brought in contact with the base of the bulb, a lever pivotally mounted on the cylindrical portion and extending therein, an insulating plate located on the lever, said plate to be brought in contact with the spring when the lever is pulled upon for bringing the spring in contact with the bulb, a handle located in the cylindrical portion and a contact plate attached to the handle with which the zinc covering of the battery contacts for completing a circuit and illuminating the bulb, substantially as specified.

In testimony whereof I have signed my name to this specification, in presence of two subscribing witnesses.

EDWARD J. TIMMONS.

Witnesses:
A. A. EICKS,
B. AUSTINE.